Feb. 20, 1951 J. H. FRIEDMAN 2,542,864
MACHINE FOR MAKING NUTS
Filed April 19, 1946 8 Sheets-Sheet 1

Fig. 1

INVENTOR.
JOHN H. FRIEDMAN
BY Richey + Watts
ATTORNEYS

Feb. 20, 1951     J. H. FRIEDMAN     2,542,864
MACHINE FOR MAKING NUTS
Filed April 19, 1946     8 Sheets-Sheet 2

INVENTOR.
JOHN H. FRIEDMAN
BY Richey & Watts
ATTORNEYS

Feb. 20, 1951 J. H. FRIEDMAN 2,542,864
MACHINE FOR MAKING NUTS
Filed April 19, 1946 8 Sheets-Sheet 3

INVENTOR.
JOHN H. FRIEDMAN
BY Richey & Watts
ATTORNEYS

Feb. 20, 1951 J. H. FRIEDMAN 2,542,864
MACHINE FOR MAKING NUTS
Filed April 19, 1946 8 Sheets-Sheet 4

INVENTOR.
JOHN H. FRIEDMAN
BY Richey & Watts
ATTORNEYS

Feb. 20, 1951 J. H. FRIEDMAN 2,542,864
MACHINE FOR MAKING NUTS
Filed April 19, 1946 8 Sheets-Sheet 5

INVENTOR.
JOHN H. FRIEDMAN
BY Richey & Watts
ATTORNEYS

Feb. 20, 1951 J. H. FRIEDMAN 2,542,864
MACHINE FOR MAKING NUTS
Filed April 19, 1946 8 Sheets-Sheet 7

INVENTOR.
JOHN H. FRIEDMAN
BY Richey & Watts
ATTORNEYS

Feb. 20, 1951 J. H. FRIEDMAN 2,542,864
MACHINE FOR MAKING NUTS
Filed April 19, 1946 8 Sheets-Sheet 8

Fig. 22

INVENTOR.
JOHN H. FRIEDMAN
BY Richey & Watts
ATTORNEYS

Patented Feb. 20, 1951

2,542,864

UNITED STATES PATENT OFFICE 2,542,864

MACHINE FOR MAKING NUTS

John H. Friedman, Tiffin, Ohio, assignor to The National Machinery Company, Tiffin, Ohio, a corporation of Ohio Application April 19, 1946, Serial No. 663,569

11 Claims. (Cl. 10—76)

This invention relates to a machine for making nuts and similar articles by cold heading, more particularly to a multistage transfer header for making pierced nut blanks from wire or rod stock. This application is a continuation in part of my copending application, Serial No. 547,849, filed August 3, 1944.

Some difficulty has been experienced in prior machines of this type in the forming of an accurately shaped nut or blank without excessively cold working the metal of the blank. It is an object of this invention to so shape and design the dies and the heading or punching tools that an accurate blank is formed which blank remains ductile so that any succeeding tapping or other operations may be performed without an intermediate annealing. In addition, it is an object to increase the life of the forming tools and the dies by designing them so that they cooperate to form the blank in a series of operations none of which require excessive pressure with the attendant distortion and wear of the tools.

Generally speaking, these objects are attained by arranging the dies and tools so that in some of the operations metal is radially expanded to fill up corners and edges of the die by leverage or toggle action of the metal within the blank itself, the pressure exerted by the tool being appreciably smaller than that required to produce a similar blank in machines of the prior art.

Another object of the present invention is to provide a die and punch which permits the punching of an axial hole through the blank without distorting the exterior surface of the blank or causing the blank to freeze in the die. This is accomplished in the preferred embodiment by limiting the confining action of the side walls of the die to a portion of the blank during the punching operation. When the punch is forced in from the free face of the blank, the metal of the blank may spring outwardly during the punching so that the punch may do its work without excessive force. With this arrangement, permanent deformation of the blank cannot occur because of the confining force exerted by that portion of the die which surrounds the blank. This also has the advantage that the blank may be readily freed from the limited area which confines it when the punch is retracted.

Other objects and advantages of the invention will appear from the following detailed description of the preferred embodiment of the apparatus for carrying out the same.

Figure 1:
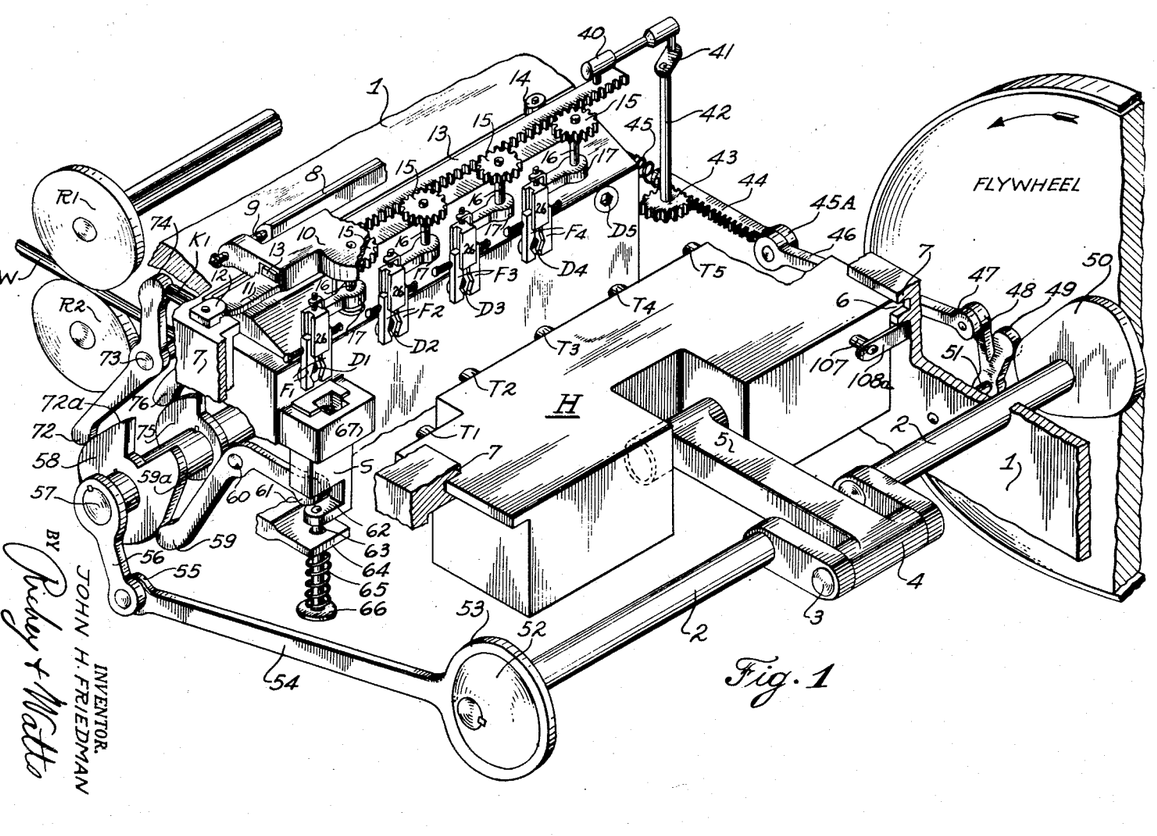
Fig. 1 is a three-dimensional schematic diagram of the basic parts of the machine which concern this invention.

Referring now to the drawings, Fig. 1 is a simplified schematic diagram of certain major parts of the entire machine which diagram is presented in order to give an overall understanding of the operation of those parts of the machine critical to this invention and how those parts are interrelated. Fundamentally, the header includes five dies or stations $D_1$ to $D_5$ carried in a die block B so arranged that towards the end of the forward stroke of the header H the tools on the header $T_1$ to $T_5$ simultaneously perform an operation on the blanks or pieces in the dies. A set of transfer finger assemblies $F_1$ to $F_4$ are provided, their purpose being to receive a piece made in one die and to turn it around and position it in front of the adjacent die before the header makes its next forward stroke. A knock-out plunger is provided for each of the first four dies or stations one of which, $K_1$, can be seen behind the first die $D_1$. Mechanism is provided to move these knock-out plungers at the proper time in order to push the blank in the dies out into the transfer fingers, which are at that time resting in front of the dies.

A rack and pinion mechanism is provided to rotate the transfer fingers so that they are moved from one die to a position in front of the next die as previously mentioned. The stock W may be in a form of wire or bar stock, and it is fed by an intermittent feed mechanism which drives one or more feed rollers $R_1$ and $R_2$ forcing the stock into a shearing mechanism S. A suitable feed mechanism is described in my co-pending applications, Serial No. 644,531, filed January 31, 1946, issued January 16, 1951, as Patent 2,538,619, and Serial No. 660,571, filed April 8, 1946. The shearing mechanism S shears off a length of stock and positions it in front of the first die $D_1$ which will be described in detail presently.

The preceding description merely presents a brief overall description of certain basic operations performed by the machine. Referring again to Fig. 1 and describing that figure in more detail, the frame 1 has been broken away at numerous points in order that the mechanism may be revealed, but in accordance with usual machine design the frame 1 is provided to form a support and housing member for the various moving parts. As can be seen at the right of the figure a fly wheel driven by a belt may supply the power for the machine and the fly wheel drives a crank shaft 2. An offset crank pin 3 is provided in the usual manner to drive a connecting rod as at 4, the other end of the connecting rod being pivoted to the header slide as at 5 in accordance with conventional machine design practice. The header block is guided in ways shown at 6 and 7 to permit its reciprocation. The header block H supports five heading tools, $T_1$ to $T_5$ respectively, each of which works in conjunction with the dies $D_1$ to $D_5$ on the die block B.

The transfer fingers and their general operating and mounting assembly are designed and arranged in a novel manner shown in Fig. 1 with some parts broken away for clarity. A mounting block 8, one end of which is shown in the figure, is carried by the frame 1 and pivot screws 9 are threaded into a transfer gear housing 10 which housing has been largely broken away to reveal the mechanism within it. At each end of the gear housing 10, an ear 11 may be provided which may be clamped to the frame 1 by a pair of clamping blocks 12 only one of which is visible in the drawing. This assembly of parts 8, 9, 10, 11 and 12 permits the entire transfer gear housing and the finger assembly to be released and pivoted clear of the dies for service or adjustment or other maintenance operations. Continuing the description of the transfer mechanism shown in Fig. 1, rack 13 is carried in the transfer housing 10 and it may be guided by one or more rollers 14 also mounted in the housing. Four pinions 15 are mounted in the housing and they drive vertical transfer shafts 16. These pinions are arranged so that the shafts 16 are centered between their associated dies. The transfer finger mounting assembly includes supporting arm 17 and finger mounting block 26 cooperating to support their associated fingers.

Figures 2, 3, 4:
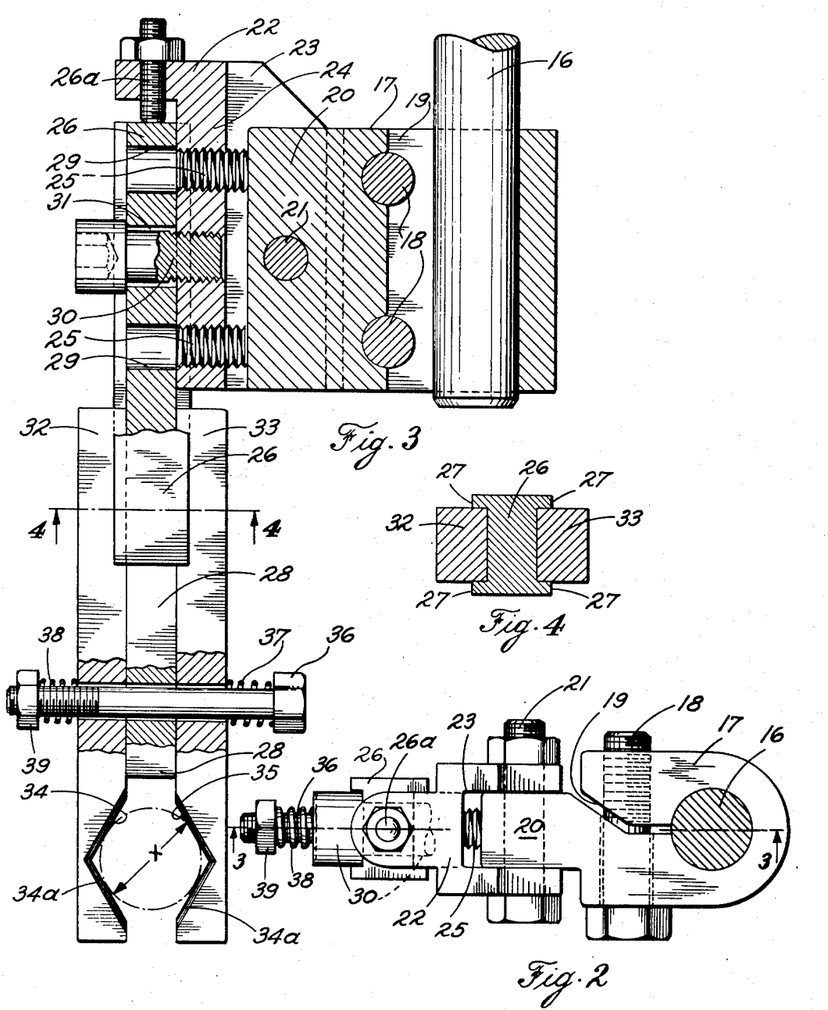
Fig. 2 is a top view of a transfer finger supporting assembly.
Fig. 3 is a partial section taken on the line 3—3 of Fig. 2.
Fig. 4 is a cross section through a pair of transfer fingers and their supporting block taken on the line 4—4 of Fig. 3.

Before continuing the description of the overall schematic of the machine shown in Fig. 1, reference is now made to Figs. 2, 3 and 4 which show details of the transfer finger assembly. These fingers must be arranged to receive the blanks as they are knocked out of their respective dies, and they must grip them while the fingers are being rotated by shaft 16 and positioned in front of their respective succeeding dies. Referring to Figs. 2 and 3, it can be seen how supporting shaft 16 supports a transfer finger hub 17 which is clamped to the shaft by means of a pair of fasteners 18 and which is slotted as at 19 to facilitate this clamping action. The hub 17 has a tongue 20 which is drilled to receive a bolt 21 which bolt supports a transfer finger adjust block 22 in the hub. The adjust block is grooved as at 23 to receive the tongue 20 and the body of the adjust block 22 has a wall portion 24 which is tapped to receive adjusting screws 25. As can be best seen in Fig. 3, the tightening of one screw 25 and the loosening of the other provides a lateral adjustment for the transfer fingers and aids in accurately positioning them with respect to their respective dies. Clamped to the adjust block 22 is the transfer finger assembly block 26. This block has four flange portions 27 to provide a groove receiving the transfer fingers 32 and 33. The block 26 has an extended portion 28 which limits the inward motion of the transfer fingers. The assembly block 26 has a pair of apertures 29 which merely provide access to the set screws 25 previously described. The assembly block 26 is clamped to the adjust block 22 by means of a bolt or other fastening device 30. This bolt passes through an elongated slot 31 in order that the assembly block 26 may be longitudinally moved relative to the adjust block 22 before being clamped by the bolt 30. This provides for a vertical adjustment of the transfer fingers relative to the die. A stop screw 26a is threaded in the adjust block 22 to aid in the vertical adjustment of the transfer finger assembly block 26.

Fig. 4 shows how the transfer fingers 32 and 33 are mounted in the grooves formed by flange portions 27 of the assembly block 26. At the lower part of Fig. 3 there can be seen the notched portions 34 and 35 of the transfer fingers 32 and 33 respectively. A dotted circle whose diameter is indicated at X in Fig. 3 represents a circle which is inscribed within a portion of a hexagon formed by the notched portions 34 and 35 of the transfer fingers. The relative proportion of the parts and that of the stop 28 is such that the fingers will grip round stock of the diameter X. It can be seen that the fingers will also grip a blank which has the shape of a hexagon circumscribed about the same base circle without separation from the stop 28. The transfer fingers are beveled as at 34a so that a round tool will go between the fingers without damage to either the fingers or the tool even though the tool be slightly larger than the basic diameter X. With this arrangement fingers will grip both round, partially hexagonal, or completely hexagonal stock without requiring much spreading. Likewise, round and hexagonal tools may pass through the fingers and even if the tools are slightly larger than the basic diameter X the beveled edges 34a and 34b permit the tool to pass through the fingers causing them to be wedged slightly apart. A bolt 36 passes through suitable apertures in transfer fingers in the assembly block and a pair of springs 37 and 38 along with an adjusting nut 39 are so disposed as to urge the fingers against the stop 28. This spring arrangement permits tools having a larger basic diameter than the circle X to pass through the fingers without damage to the fingers or to the tool.

Having described the transfer fingers and their assembly mechanisms, we turn back to Fig. 1 to complete the description of the basic parts of my machine. At the end of the transfer rack 13 can be seen a pivoted connecting link 40 which is pivoted to the rack 13 at one end and to a crank 41 at its other end. The purpose of link 40 is to move the rack and hence pivot transfer fingers form one die to an adjacent die in proper timed relation to the cycle. This is accomplished by turning crank 41 by means of a shaft 42 which mounts a pinion 43. A second rack 44 is urged in one direction by a spring 45 and its other end 45a is pivoted to link 46. Link 46 is reciprocated by being pinned at 47 to a bell crank lever 48. Bell crank 48 engages at 49 the transfer mechanism operating and timing cam 50, which cam is attached to the crank shaft 1. The cam is so cut that the transfer fingers are positioned correctly during the cycle. This cam must insure that the transfer fingers each are placed to receive the blanks as they are knocked out of their associated dies and also that they are pivoted to the adjacent die in order to position the blanks in front thereof before the header tools reach the end of the stroke.

In order to provide the driving means for the shear S and the knock-out pins K, an eccentric 52 is attached to the crank shaft 2, this eccentric being shown at the end of the crank shaft opposite the fly wheel in Fig. 1. A strap 53 surrounds eccentric disc 52 and causes reciprocating motion of the arm 54 which arm is connected at 55 to the crank arm 56 attached to a cam shaft 57. Cam shaft 57 carries a number of cams which operate the knock-out pins and which move the shear in the proper timed relationship to the stroke of the header H, and the position of the transfer fingers. The shear S is moved by a bell crank 59 which engages a properly arranged cam surface 59a on cam 58. The eccentric driving arrangement shown in Fig. 1 causes an oscillatory rotation of cam shaft 57 resulting in an oscillatory pivoting of the bell crank 59 about its fixed pivot 60. Bell crank 59 may have a portion formed as at 61 to engage in a recess 62 formed in the sliding shear block S. A shear retracting rod 63 is attached to shear block S and the rod passes through a fixed plate 64 and carries a shear retracting spring 65. The shear retracting spring bears at one end against fixed plate 64 and at the other end against collar 66 attached to rod 63. With the assembly just described rotary motion of the crank shaft 2 is converted into oscillating motion of the crank arm 56 which, in turn, causes an oscillating partial rotation of the cam shaft 57 and the cam 58. This, in turn, causes oscillation of the bell crank 59 about the pivot 60 which in one direction raises the shearing block S, the shearing block being returned by the spring 65 when the cam shaft is turned in the other direction. The guiding block shown diagrammatically at 67 is attached to the frame 1 and serves to guide the shearing block S while permitting it to partake of a rectilinear reciprocating motion.

Figure 5:
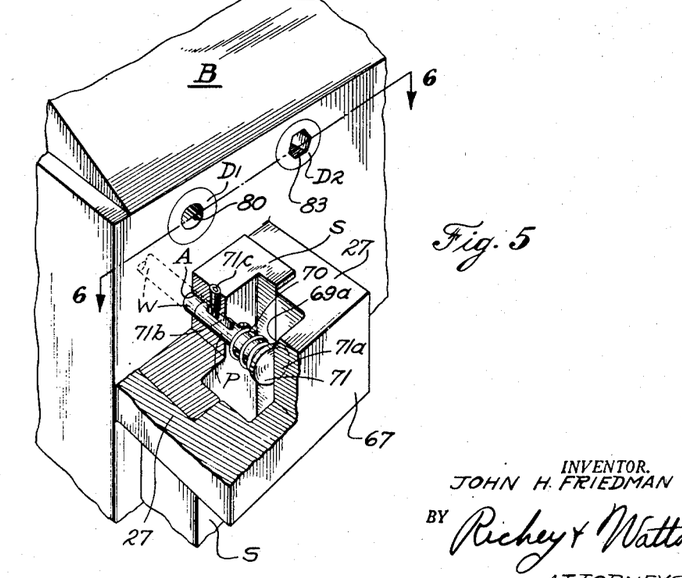
Fig. 5 is a three-dimensional diagram, partially sectioned, of one form of shearing device shown just as shearing action begins.

Before continuing with the description of the machine shown diagrammatically in Fig. 1, reference is made to Fig. 5 which shows an enlarged sectional view of the shearing block arrangement. In this figure shearing block S can be seen guided by a guide 67 and bearing against the face of the die block B. The shear block S is grooved at 69 to provide a recess for the shank of the punch pin P. This pin is mounted in an aperture A in the shear block S and has a portion extending into the aforementioned recess. A spring 70 surrounds the shank of pin P and the pin has a head 71 which may abut against a surface 71a in the guide 67. The method whereby the pin is permitted to move within the shear block and kept from complete withdrawal is illustrated by a groove 71b in the pin and a set screw 71c in the shear block. Cam surface 69a is provided to guide the pin on its down stroke. The manner in which the stock is sheared and positioned by the shear will be described later when a cycle of operation is explained.

Turning again to Fig. 1, there remains to be described the principle for operating the knock-out mechanism. A series of knock-out pins K is provided, one for each of the dies $D_1$ to $D_4$ the pin $K_1$ only being visible in Fig. 1. The pin $K_1$ is moved at the proper time to force the blank in its associated die into the transfer fingers, by a lever 72 which engages the knock-out surface 72a formed on the cam 58. Lever 72 is pivoted about a fixed pin 73 causing the other end 74 of the lever to force the knock-out pin $K_1$ forward in its ejecting position at the proper time. Knock-out pin $K_1$ is forced back by the action of the header tool $T_1$ or it may be retracted by a spring. A second knock-out cam 75 can be seen on the cam shaft 57 to the right of cam shaft 58, this cam operating another knock-out lever 76 only a portion of which is visible. This lever operates the knock-out pin for die $D_2$ and similarly a cam lever and knock-out cam is provided for die $D_3$ and die $D_4$. For reasons which will be made clear when the cycle is explained, no knock-out pin is required for die $D_5$.

The method of driving the feed rollers $R_1$ or $R_2$ in order to feed the stock W is described in the co-pending application, Serial No. 644,531, issued January 16, 1951, as Patent 2,538,619, which shows the link mechanism required for that operation. An overrunning clutch is provided in the feed mechanism, a preferred form of such a clutch being shown in my co-pending application, Serial No. 660,571. Another form of feed clutch suitable for this purpose is described in Patent No. 1,856,027 to W. L. Clouse issued April 26, 1932.

Having completed the description of the basic elements of my improved machine, I will now explain and illustrates a cycle of operation. For this explanation, a series of drawings will be used which merely show the relation of the pieces being made, the dies, the header tools, the shear and the transfer fingers. It will be understood during the description which follows that the mechanisms which operate these various members and which are shown schematically in Fig. 1 are functioning in the proper timed relationship as determined by the shape and position of the various cams, the crank shaft, and the eccentric on the crank shaft. The basic timing requirements which dictate the shape and design of these parts will be indicated in the description of a cycle which follows:

Fig. 5 shows the arrangement whereby a blank of the proper length may be sheared from the stock W. With the header is a relatively retracted position, the shear driving mechanism positions the shear S along the die body B so that the aperture A in the shear S is opposite an aperture of substantially equal diameter in the body B in which lies the stock W. The stock feeding mechanism is so timed that under these conditions stock is fed into the aperture A until it is stopped by the pin P, this action forcing the head 71 on the pin against the abutment 71a on the guide member 67. Of course, an experienced mechanic will realize that an adjustable stop screw may be provided to regulate the exact length of stock W fed into the aperture A in the shear. As the cycle continues the cam which drives the shear S causes the shear to be forced upward, shearing a blank from stock W. Pin P is also carried upward and when the shear reaches its terminal position the blank is opposite the recess 80 in the die $D_1$ and pin P is entirely clear of the guide member 67. The next step can be seen in Fig. 6 which is a section through the dies as at 6—6 of Fig. 5 and since the shear S is now opposite the die $D_1$ it, too, appears sectioned in Fig. 6.

Figure 6:
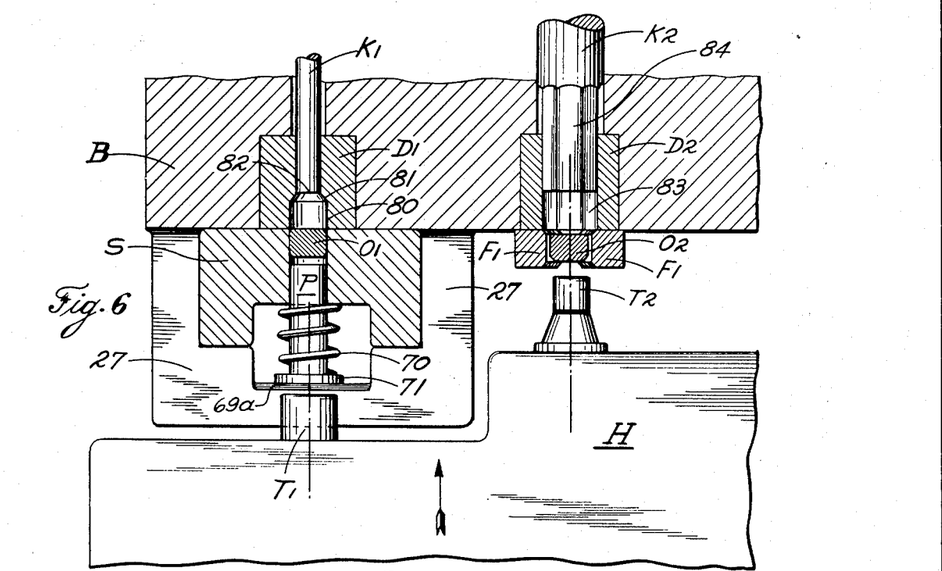
Fig. 6 is a top view of the first two stations, the dies being sectioned as at line 6—6 of Fig. 5. The sheared piece of stock is positioned in front of the first die in this figure.

In Fig. 6 it can be seen that the header H is approaching the work and that shear S has positioned the blank labeled $O_1$ opposite recess 80 in die $D_1$. The recess 80 in the die terminates in a conical portion 81 and the die is closed by the end 82 of the knock-out rod $K_1$. The situation which exists at this time at die $D_2$ can also be seen in Fig. 6. Die $D_2$ is hexagonal as can be seen at 83 and is closed by a hexagonal portion 84 formed on the knock-out $K_2$ for that die. The transfer fingers $F_1$ carrying the piece $O_2$ as it appears after the first heading operation can also be seen in Fig. 6. Detailed reference to these will be made presently. Referring back to blank $O_1$, it can be seen that it is ready to be forced into the die $D_1$.

Figure 7:
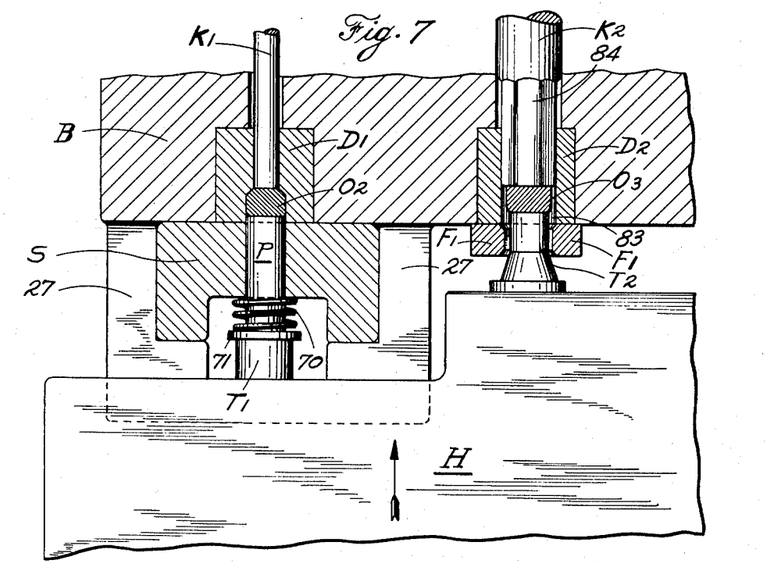
Fig. 7 is like Fig. 6 except that the cycle has advanced to the point where the header tool is at its extreme forward position.
Figure 8:
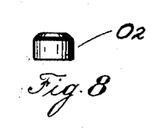
Fig. 8 shows the piece made in the first die.

Fig. 7 shows the completion of this heading operation with the tool $T_1$ forcing the pin P against the blank anad heading it into its new form $O_2$ in the die. The upsetting of the blank into the die $D_2$ to form the blank $O_2$ serves to size the blank by pressing it into close contact with the die, removing irregularities of the end faces resulting from the shearing action and eliminating non-uniformities in cross sectional shape which may have existed in the stock W or the blank initially sheared therefrom. Fig. 8 is an exterior view of the piece $O_2$ after the first forming operation.

Figure 10:
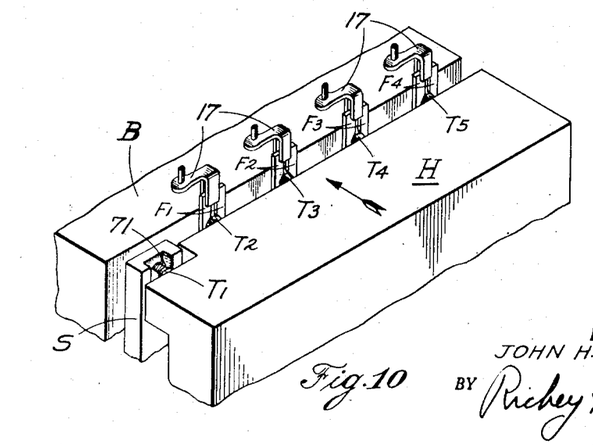
Fig. 10 is a highly simplified schematic of the transfer finger arrangement showing the transfer finger position during the operation illustrated in Fig. 7.
Figure 11:
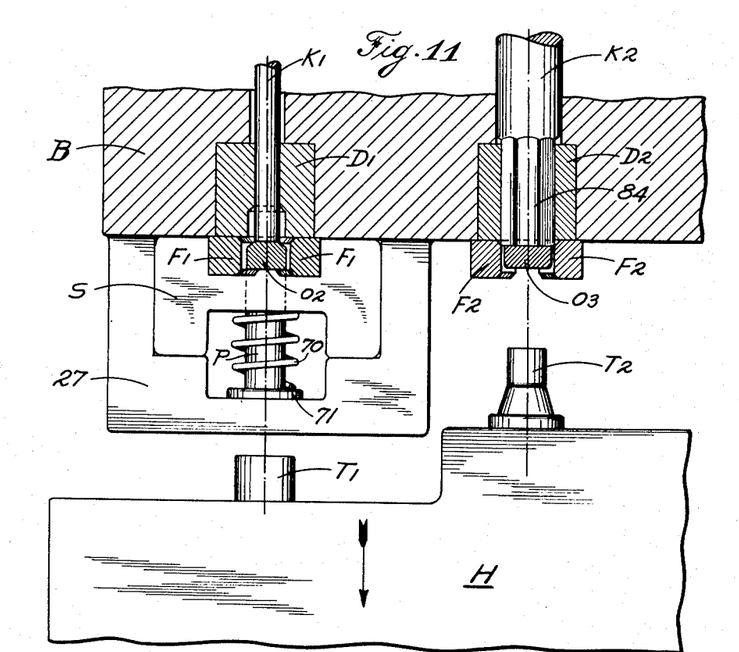
Fig. 11 is like Fig. 7 except that the knock-out process has just been completed.
Figure 12:
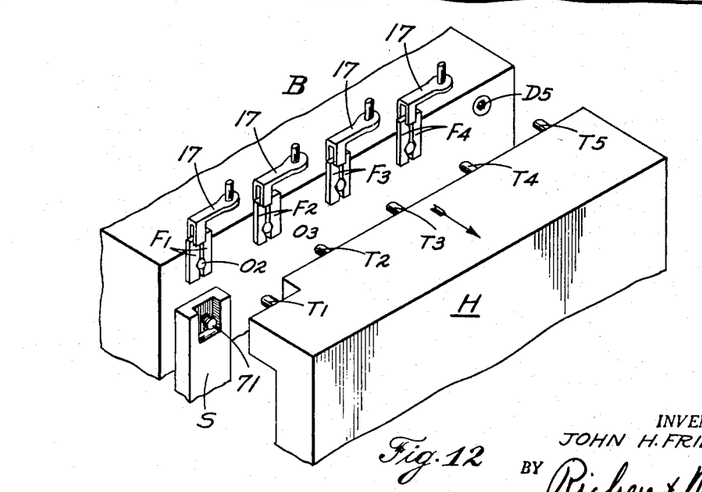
Fig. 12 is another schematic of the transfer finger position existing during the operation shown in Fig. 11.

The next operation in the cycle with reference to the station at die $D_1$ is illustrated in Figs. 11 and 12. As the header slide H retracts, several things happen simultaneously and in timed relationship to one another. The pin P shown partially entering the die $D_1$ in Fig. 7 is permitted to retract under the action of spring 70 so that as seen in Fig. 11 the shear S may be carried down below the die $D_1$ without damage to the pin. Also, the fingers F which were at their right position during the heading operation, as can be seen in the diagram of Fig. 10, are pivoted by the transfer mechanism about their vertical shafts and come to rest in their left position as seen in the diagram at Fig. 12. The cams which operate the knock-out pins are so arranged that as seen in Fig. 11, the knock-out pin $K_1$ for example, forces the blank $O_2$ out of die $D_1$ and into the pair of fingers $F_1$ positioned in front of the die. The diameter of the piece $O_2$ after the first forming operation is slightly less than the base circle diameter of the completed nut but not enough less to prevent the fingers $F_1$ from gripping the blank.

Figure 9:
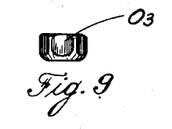
Fig. 9 shows the piece made in the second die from that shown in Fig. 8.

Continuing to follow the cycle insofar as affects the blank $O_2$ reference is made to Fig. 6 where the blank $O_2$ can be seen positioned in front of die $D_2$ by the fingers $F_1$. Obviously, the fingers have been positioned as shown in Fig. 10 at this time. Fig. 6 also shows the internal shape of the bore in die $D_2$, that bore being hexagonal as shown at 83 and being closed by the hexagonal portion 84 on the knock-out pin $K_2$. Fingers $F_1$ assume the position shown in Fig. 6 and Fig. 10 before the header H is moved forward enough to interfere with the fingers, then as shown in Fig. 7 the tool $T_2$ forces the blank $O_2$ out of the fingers $F_1$ and into the die $D_2$ forming the blank $O_2$ into the blank $O_3$. The tool $T_2$ is arranged to apply only a relatively light upsetting pressure to the blank $O_3$ so as to shorten it and flatten the metal into contact with the flat sides of the hexagon defined by the die $D_2$, without attempting to flow the metal to completely fill up the corners of the hexagon. This operation produces the blank $O_3$ an external view of which appears in Fig. 9. As the header slide retracts the fingers move from their position shown in Fig. 10 to that shown in Fig. 12 so that now finger $F_2$ is in front of die $D_2$ with which the knock-out pin $K_2$ forces the blank $O_3$ out of die $D_2$ and into the fingers $F_2$.

Figure 13:
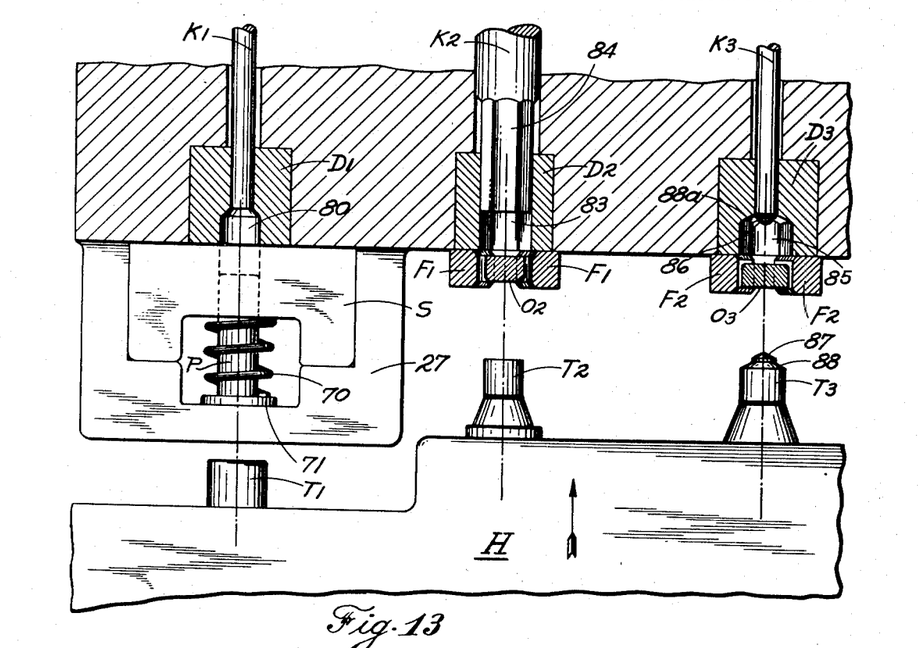
Fig. 13 is another section through the dies showing the third station, the header slide being in the early part of its forward stroke in this figure.
Figure 14:
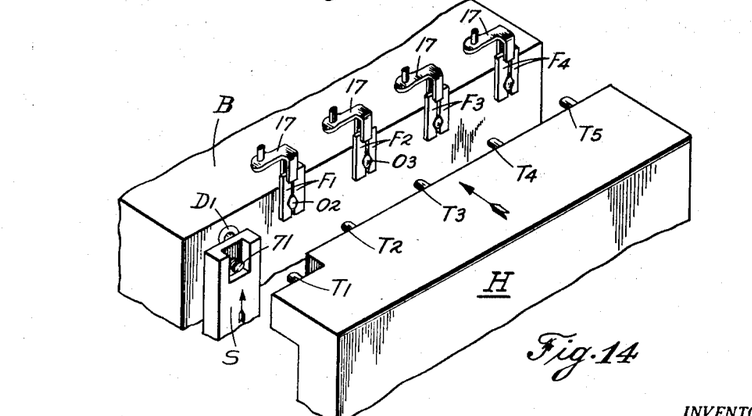
Fig. 14 is a schematic showing the finger position existing during that part of the cycle shown in Fig. 13.

As the cycle continues, fingers $F_2$ turn the blank over and place it in front of die $D_3$ as shown in Fig. 13. Thus the blank is continuously moved along from die to die by providing a proper timing relationship between the transfer mechanism which operates the fingers and that mechanism which drives the knock-out pins. The fingers are now again at their right position as shown in the diagram in Fig. 14, and as shown at the right of Fig. 13 the header tool $T_3$ is approaching the blank $O_3$ in order to force it into the die $D_3$. Die $D_3$ has a hexagonal bore 85 terminating in a conically dished portion. The knock-out pin $K_3$ has a convex generally conically shaped terminal portion 86. Tool $T_3$ has a conical end portion 87 which is axially displaced slightly from a second conical portion 88.

Figures 15, 16, 17:
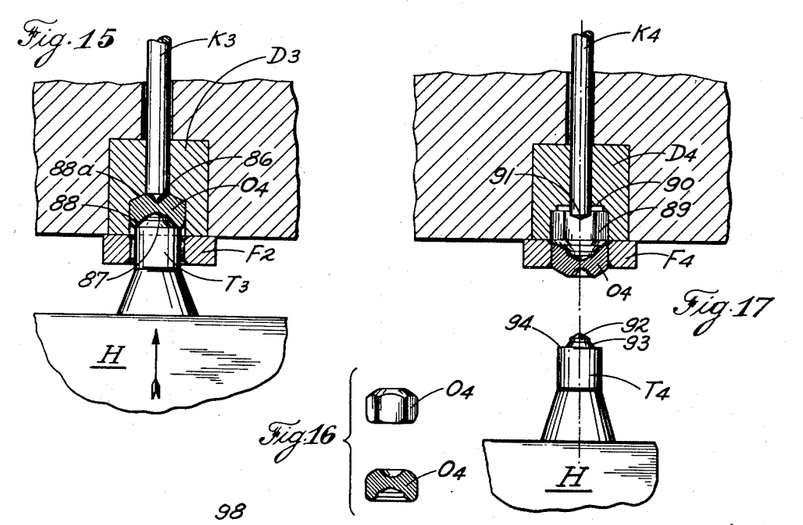
Fig. 15 shows the heading operation carried out at the third station.
Fig. 16 includes an exterior and cross-sectional view of the piece made at the third station.
Fig. 17 shows the piece made at the third station positioned by the fingers in front of the fourth station before the heading is accomplished.

Fig. 15 shows the header H in its extreme forward position with the tool $T_3$ forming the blank $O_4$ in the die $D_3$. The fingers in this case remain in the position shown in Fig. 13 and also shown in the diagram of Fig. 10. When the blank $O_4$ is formed in the die $D_3$, because of the substantially complementary faces 88 on the tool $T_3$ and 88a in the die $D_3$, the blank as a whole is dished. At the same time, the nose 86 on the knock-out pin indents the blank centrally in the zone that is ultimately to be punched out to form the hole. The bending of the blank in the dishing operation tends to force the metal of the blank adjacent the bottom face of the die 86a radially outwardly and drives the metal strongly into the corners of the die, so that the corners are filled to a greater extent than they were in the previous operation in the die $D_2$. The conical surface 88 on the tool $T_3$ and the conical nose 87 on the tool assist this corner filling action by tending to spread the blank radially outwardly. This operation produces the dished or concavo-convex blank $O_4$ shown clearly in Fig. 16.

In the interests of brevity the intermediate steps of knocking out the blank into the transfer fingers and the turning over and positioning of the blank adjacent succeeding die by the transfer fingers will not be broken into a complete series of illustrated steps in the balance of this description, the action of the machine being like that previously described.

Fig. 17 shows the blank $O_4$ positioned in front of the die $D_4$ by fingers $F_4$. These fingers, as has been described previously, have been placed in front of die $D_3$ to receive the blank $O_4$ as it was knocked out of that die, and they have also been moved in front of die $D_4$ by the transfer mechanism to occupy the position shown in Fig. 17. The die $D_4$ has a hexagonal bore 89, and if washer face nuts are being made, a cylindrical bottom portion 90 will be formed in the die. Knock-out pin $K_4$ extends partially into the die and has a conical nose 91. Tool $T_4$ has a nose 92 for indenting the blank, and conical portion 93 for forming a bevel adjacent what eventually will be the hole in the blank, and the tool has a flat face 94 for forming the outer flat face of the finished nut.

Figure 18:
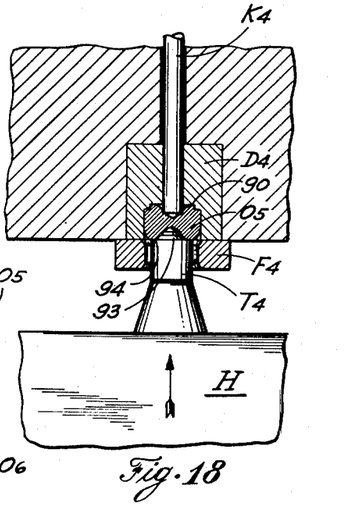
Fig. 18 shows the heading completed in the fourth station.

In Fig. 18 the blank $O_4$ has been forced into the die $D_4$ to form the blank $O_5$. It can also be seen how the bevel portion 93 on the tool $T_4$ produces the beveled portion in the nut and how the flat portion 94 of the tool produces the flat face of the nut. As the blank is formed in the die $D_4$ the blank as a whole is bent to remove the concavo-convex shape it attained in the previous operation. This tends to force the metal strongly into the corners of the hexagon of the die opening and to fill up these corners as well as the washer portion 90 sharply and completely. The flat surface 94 on the tool $T_4$ does not extend far enough to flatten the entire outer face of the nut so that as seen in Fig. 18 and also in Fig. 19 which shows the completed blank $O_5$, a slight chamfer remains on the outer surface of the nut.

Figures 19, 20, 21:
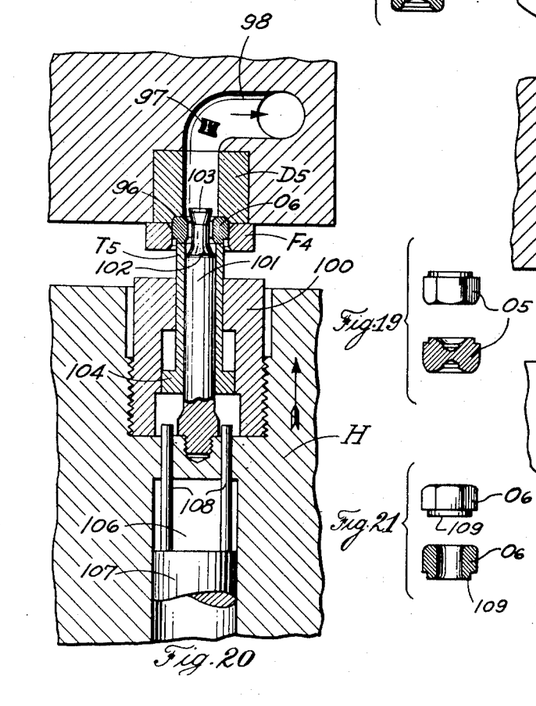
Fig. 19 shows the external and cross-sectional view of the piece made in the fourth station.
Fig. 20 shows the punching operation being carried out in the fifth station.
Fig. 21 shows an exterior view in cross section with the piece made in the fifth station.
Figure 22:
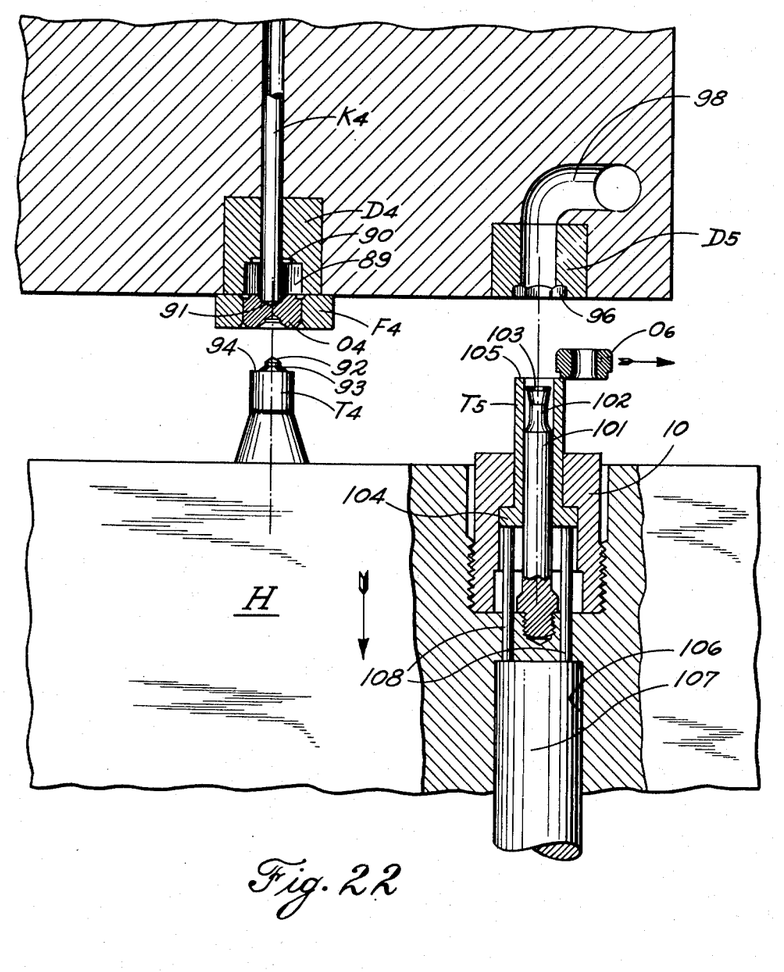
Fig. 22 shows the final piece being stripped from the punch at the fifth station and also shows the piece being knocked out of the die and into the transfer fingers in the fourth station.

After the completion of the forming operation carried out in Fig. 18, knock-out pin $K_4$ ejects the blank into fingers $F_4$ and as the header slide retracts, fingers $F_4$ place the blank $O_5$ in front of the next and final die $D_5$. Then, as shown in Fig. 20, in the die $D_5$ the blank $O_5$ is punched out to form the finished nut blank $O_6$. A clearer understanding of the punching operation may be had if parts of Fig. 22 are examined before the actual punching operation shown in Fig. 20 is explained. To the left of Fig. 22 can be seen the blank $O_5$ as it is knocked out from die $D_4$ by knock-out pin $K_4$ into the fingers $F_4$ this operation being that which immediately follows the heading operation which has been explained in connection with Fig. 18. Also, before explaining the punching operation, reference is made to the die $D_5$ shown in Fig. 22. This die is formed with a shallow hexagonally shaped bore 96 the face of which bore corresponds to the face of the finished blank. The bore 96 is of such a size as to firmly grip the blank $O_5$ after it has been positioned in front of the die by the fingers $F_4$ and forced therein by the punch as will be described in connection with Fig. 20. Turning now to Fig. 20, it can be seen that the fingers $F_4$ are positioned in front of the die $D_5$, and that a punch 101 has punched out a center web 97 which falls out and which is ejected through an outlet aperture in the die body 98. Punch 101 may be threaded or attached in any convenient manner to the header slide H. The punch is formed at its working end with a portion of reduced diameter 102 and a punching portion 103. As the tool $T_5$ which includes the punch just described approaches the die body, the punch advances and enters the recess in the bottom or washer face side of the blank $O_5$. The blank is first pushed into the recess 96 in die $D_5$ so that its top face engages the bottom wall and side walls of the bore in the die and those portions of the blank are thereby confined by the side walls of the die. The punch continues to advance and the working portion 103 shears the web 97 from the blank to form an opening therethrough and to produce the final blank made in this machine labeled $O_6$. The punch first engages the web or wad 97 and starts the shearing action in the blank at a point lying in a transverse plane outside of the die $D_5$. Thus the entire blank is permitted to swell slightly under pressure of the punching operation permitting free movement of punch. Distortion of the blank is prevented, however, by the confining walls of the die and the swelling of the blank is in no case great enough to exceed the elastic limit of the material. Therefore, after the working end portion 103 of the punch has passed through the blank to the position shown in Fig. 20, the metal of the blank springs back to its initial shape and the wad or web 97 is discharged through the opening 98.

As the header slide H is retracted, black $O_6$ is withdrawn from the die $D_5$ by the working portion 103 of the punch the reduced portion 102 of the punch carrying the blank. At about this time the remainder of the structure of tool $T_5$ comes into action to strip the blank $O_6$ from the punch. The stripping structure includes a freely movable sleeve 104 surrounding the punch 101 and retained in the header by the threaded collar 100. A stationary plunger 107 fits into an aperture 106 in the header slide and carries rods 108. Plunger 107, as can be seen in Fig. 1, may be mounted on some fixed portion of the machine such as the frame by a bracket 108a so that the plunger remains stationary as the header slide H is moved. When the header slide retracts a certain distance as shown in Fig. 22, the head of the stripping sleeve 104 is brought against the end of the fixed rods 108 so that the stripping sleeve can move back no farther. Then as the header slide continues its retracting motion, the punch is pulled through the sleeve so that the washer face 109 of the blank engages the end face 105 of the stripping sleeve. Further motion causes the punch to be pulled back through the aperture in the blank. This action continues until the blank $O_6$ is stripped clear of the punch and the blank may fall into a receiver for the final tapping operation.

Having completed the description of the preferred form of my machine, those skilled in the art will understand that the formation of the dies and heading tools which I have provided makes it possible to make accurate nuts well filled out in all the corners and with flat even faces the metal of which has not been cold worked to an extent whereby the nuts will be difficult to tap or will be hard and brittle. The dishing operation and its action as a force multiplier within the metal of the nut itself makes it possible to produce the accurate and well filled out nuts made by my machine without requiring an excessive amount of force to carry out the various operations. This, in turn, makes it possible to do the forming operation successfully with heading tools which have shank portions long enough to pass through the transfer fingers even though those fingers remain in place throughout the entire forming operation and are not mechanically opened or moved clear of the heading tool. My machine makes it possible to provide a heading tool with a shank portion of appreciable length but of a diameter small enough to pass through the fingers. The exact configuration of the fingers may be varied, so long as they perform the same function without the exercise of other than mechanical skill. The various machine elements illustrated and described in this specification, particularly those appearing in Fig. 1, are presented in order to give an overall description of the interrelationship of various basic units of machines of this type. It is contemplated that variations on the machine herein illustrated made in accordance with typical machine design practice may be performed without departing from the spirit of the appended claims.

Having thus described the present invention so that others skilled in the art may be able to understand and practice the same, I state that what I desire to secure by Letters Patent is defined in what is claimed.

I claim:

1. An apparatus for making nuts and the like comprising a first die having an axial recess of polygonal cross section said recess being closed by an inner bottom wall substantially perpendicular to the axis of said recess, transfer means to position stock in front of said first die, a header tool having a substantially flat end face for upsetting the stock in the first die to form a blank having a rough polygonal outline with end faces substantially perpendicular to its side walls, a second die having a recess of polygonal cross section with a generally concave inner wall, transfer means to position said blank in front of said second die, a second header tool having a convex nose for upsetting and bending the blank in the second die to form a blank of concavo-convex cross section, a third die having a recess of polygonal cross section, transfer means to position said blank in front of said third die with the concave surface of the blank facing the die, a third header tool having a flat face portion for flattening said blank in said third die to remove the concavo-convex form thereof and force the metal radially outward against the polygonal walls of said third die, and means to drive said tools and said transfer means in synchronism.

2. An apparatus for making nuts and the like comprising a first die having an axial recess of polygonal cross section said recess being closed by an inner wall substantially perpendicular to the axis of said recess, transfer means to position stock in front of said first die, a header tool having a substantially flat end face for upsetting the stock in the first die to form a blank having a rough polygonal outline with end faces substantially perpendicular to its side walls, a second die of polygonal cross section with a generally concave inner wall, transfer means to position said first blank in front of said second die, a second header tool having a convex nose for upsetting and bending the blank in the second die to form a blank of concavo-convex cross section, a third die having a bore of polygonal cross section and having closure means including a central projecting portion, transfer means to position said blank in front of said third die with the concave surface of the blank facing the die, a third header tool having a central projecting portion and an outer radial portion for flattening said blank in said third die to remove the concavo-convex form thereof and force the metal radially outward against the polygonal walls of said third die, the projecting portions of said third tool and die simultaneously cooperating to form a contral web of reduced section in the blank, and means to drive said tools and said transfer means in synchronism so that the blank in each die is worked upon each stroke of the header.

3. An apparatus for making nuts and the like comprising a first die having an axial recess of polygonal cross section said recess being closed by an inner wall substantially perpendicular to the axis of said recess, transfer means to position stock in front of said first die, a header tool having a substantially flat end face for upsetting the stock in the first die to form a blank having a rough polygonal outline with end faces substantially perpendicular to its side walls, a second die of polygonal cross section with a generally concave inner wall, transfer means to position said blank in front of second die, a second header tool having a convex nose for upsetting and bending the blank in the second die to form a blank of concavo-convex cross section, a third die having a recess of polygonal cross section closed by means which form a substantially convex wall, transfer means to turn said blank around and position it in front of said third die with the concave surface of the blank facing the die, a third header tool having a convex nose portion for flattening said blank in said third die to remove the concavo-convex form thereof and force the metal radially outward against the polygonal walls of said third die forming a blank with a polygonal outline and indented side faces, and means to drive said tools and said transfer means in synchronism.

4. An apparatus for making nuts and the like comprising a first die having an axial recess of polygonal cross section said recess being closed by an inner bottom wall substantially perpendicular to the axis of said recess, transfer means to position stock in front of said die, a header tool having a substantially flat end face for upsetting the stock in the first die to form a blank having a rough polygonal outline with end faces substantially perpendicular to its side walls, a second die having a recess of polygonal cross section with a generally concave inner bottom wall, transfer means to position said blank in front of said second die, a second header tool having a convex nose for upsetting and bending the blank in the second die to form a blank of concavo-convex cross section, a third die having a recess of polygonal cross section, transfer means to position said blank in front of said third die with its concave surface facing the die, a third header tool for flattening said blank in said third die to remove the concavo-convex form thereof and force the metal radially outward against the polygonal walls of said third die, transfer means to present said blank to a fourth die, punch means at said fourth die to punch an axial hole through said blank, and means to drive said tools, punch, and transfer means in synchronism.

5. An apparatus for making nuts and the like comprising a die having an axial recess of polygonal cross section said recess being closed by an inner bottom wall substantially perpendicular to the axis of said recess, transfer means to position stock in front of said die, a header tool having a substantially flat end face for upsetting the stock in the die to form a blank having a rough polygonal outline with end faces substantially perpendicular to its side walls, a second die having a recess of polygonal cross section with a generally concave inner bottom wall, transfer means to position said blank in front of said second die, a second header tool having a convex nose for upsetting and bending the blank in the second die to form a blank of concavo-convex cross section, a third die having a recess of polygonal cross section with a closing bottom wall having a convex portion, transfer means to position said blank in front of said third die with its concave surface facing the die, a third header tool having a central convex portion for flattening said blank in said third die to remove the concavo-convex form thereof and force the metal radially outward against the polygonal walls of said third die, and simultaneously forming a central web portion of reduced thickness, a fourth die, transfer means to present said blank to said fourth die, means at the fourth die to punch out the web portion of said blank, and means to drive said tools, punch means, and transfer means in synchronism.

6. An apparatus for making nuts and the like comprising a first die having an axial recess of polygonal cross section said recess being closed by an inner bottom wall substantially perpendicular to the axis of said recess, transfer means to position stock in front of said die, a header tool having a substantially flat end face for upsetting the stock in the die to form a blank having a rough polygonal outline with end faces substantially perpendicular to its side walls, a second die having a recess of polygonal cross section with a generally concave inner bottom wall, transfer means to position said blank in front of said second die, a second header tool having a convex nose for upsetting and bending the blank in the second die to form a blank of concavo-convex cross section, a third die having a recess of polygonal cross section and an inner bottom wall, transfer means to position said blank in front of said third die with its concave surface facing the die, a third header tool for flattening said blank in said third die to remove the concavo-convex form thereof and force the metal radially outward against the polygonal walls of said third die, fourth die having a recess with polygonal walls shallower than the thickness of the blank transfer means to present said blank to said fourth die, associated punch means to force said blank into said fourth die and punch an axial hole through the blank whereby part of said blank may expand and the remainder is confined by said die during the punching operation, and means to drive said tools, punch means, and transfer means in synchronism.

7. In a machine for making nuts and the like wherein a length of material is advanced intermittently to cut off mechanism, which successively severs portions thereof to form blanks of predetermined lengths, which blanks are thereafter subjected to successive pressure operations; a pair of work stations comprising sets of cooperating punches and dies to perform successive pressure operations on the same blank; means for presenting blanks to the first of said work stations; the punch and die set of said first work station including a polygonal side wall and end walls, one on the punch and one in the die, one of said end walls having a peripheral portion forming an acute angle with the side wall; the punch and die set of said second work station including a polygonal side wall and end walls, one on the punch and one in the die, one of the end walls having one annular flat portion forming sharp right-angled corners with the polygonal side wall and a depressed annular flat portion radially within and parallel to said one annular flat portion and spaced axially therefrom by a substantially cylindrical shoulder; and transfer fingers for gripping blanks acted on at said first work station and movably mounted to carry such blanks to said second work station and present them to the punch and die set thereof so that the faces of the blanks engaged by said one end wall of the punch and die set in the first work station engage said one end wall of the punch and die set of said second work station.

8. In a machine for making nuts and the like wherein a length of material is advanced intermittently to cut off mechanism, which successively severs portions thereof to form blanks of predetermined lengths, which blanks are thereafter subjected to successive pressure operations; a pair of work stations comprising sets of cooperating punches and dies to perform successive pressure operations on the same blank; means for presenting blanks to the first of said work stations; the punch and die set of said first work station including a polygonal side wall and end walls, one on the punch and one in the die, one of said end walls forming an obtuse angle and the other an acute angle with the side wall, the punch and die set of said second work station including a polygonal side wall and end walls, one on the punch and one in the die, one of the end walls having one annular flat portion forming sharp right-angled corners with the polygonal side wall and a depressed annular flat portion radially within and parallel to said one annular flat portion and spaced axially therefrom by a substantially cylindrical shoulder; and transfer fingers for gripping blanks acted on at said first work station and movably mounted to carry such blanks to said second work station and present them to the punch and die set thereof so that the faces of the blanks engaged by the convex end walls of the punch and die set in the first work station are positioned to engage said one end wall of the punch and die set of said second work station.

9. In a machine for making nuts and the like, embodying a bed frame and a reciprocable header slide, wherein a length of material is advanced intermittently to cut-off mechanism, which successively severs portions thereof to form blanks of predetermined lengths, which blanks are thereafter subjected to successive pressure operations; the sub-combination consisting of a die carried by the bed frame, a cooperating punch carried by the header slide and axially aligned with said die, means for transferring blanks into axial alignment with said die, said punch and die including a polygonal die side wall and an intersecting blank engaging end wall and a peripheral punch side wall and an intersecting end wall, one of said end walls including a concave portion extending radially inward from the periphery thereof and forming an obtuse angle with said die side wall and the other including a convex portion extending radially inward from the periphery thereof and forming an acute angle with said die side wall, a second die carried by the bed frame, a cooperating second punch carried by the header slide, means for transferring blanks operated on by said first named punch and die into axial alinement with said second die, said second die and second punch including a polygonal die side wall and blank engaging end walls, one on the second punch and one in the second die which intersects the polygonal side wall of the second die, one of said end walls including an annular peripheral portion forming an angle with the side wall of the second die substantially less than the angle formed by said concave portion with its associated die side wall, and the other including an annular peripheral portion forming an angle with the side wall of the second die substantially greater than the angle formed by said convex portion with its associated die side wall, said transfer means including means for presenting blanks to said second die with the face of the blank previously engaged by said convex portion positioned to engage said one end wall of said second punch and die, said second punch and die being effective substantially to flatten the blanks formed by said first die and punch.

10. In a machine for making nuts and the like comprising a bed frame, a reciprocable header slide mounted in said bed frame, and means to shear off blanks of elongated stock; first tool and die means carried by said bed frame and said header slide and arranged to true up the sheared faces of said blank, second tool and die means carried by said bed frame and header slide said second tool and die means having a peripheral die side wall and blank engaging faces, one of said blank engaging faces being convex and the other being concave, at least part of said convex and concave faces lying in axially spaced concentric zones of equal radii, third tool and die means, the die means thereof having a continuous peripheral wall to surround and confine the side wall of a blank produced by said tool and die means, said third die and tool means including a wall portion to engage the periphery of the end face of the blank previously engaged by said convex blank engaging face and a means having a flattening portion thereon to engage the central portion of the end face of the blank previously engaged by said concave blank engaging face, and transfer means for delivering blanks to said first and second tool and die means and for transferring blanks from said second tool and die means to said third die with the face of the blank previously engaged by said convex blank engaging face positioned to engage said wall portion of said third tool and die means.

11. In a machine for making nuts and the like wherein a length of material is advanced intermittently to cut off mechanism, which successively severs portions thereof to form blanks of predetermined lengths, which blanks are thereafter subjected to successive pressure operation; a pair of work stations comprising sets of cooperating punches and dies to perform successive pressure operations on the same blank; means for presenting blanks to the first of said work stations; the punch and die set of said first work station including a peripheral die side wall and end walls, one on the punch and one in the die, lying at least in part in axially spaced concentric zones of equal radii, one of said end walls forming an obtuse angle and the other an acute angle with the peripheral die side wall; transfer means inverting and transferring blanks successively from said first work station to said second work station; the punch and die set of said second work station including a peripheral die side wall and end walls, one on the punch and one in the die, the end walls having annular peripheral portions substantially perpendicular to the side wall.

JOHN H. FRIEDMAN.

REFERENCES CITED

The following references are of record in the file of this patent:

UNITED STATES PATENTS

| Number | Name | Date |
| --- | --- | --- |
| 219,363 | McLane | Sept. 9, 1879 |
| 1,279,716 | Lenman | Sept. 24, 1918 |
| 1,685,377 | Province et al. | Sept. 25, 1928 |
| 1,795,518 | Sharp | Mar. 10, 1931 |
| 1,977,162 | Wilcox | Oct. 16, 1934 |
| 1,977,163 | Wilcox | Oct. 16, 1934 |
| 2,013,460 | Erdman | Sept. 3, 1935 |
| 2,026,823 | Clouse | Jan. 7, 1936 |
| 2,074,678 | Wilcox | Mar. 23, 1937 |
| 2,080,850 | Frayer | May 18, 1937 |
| 2,100,028 | Frayer | Nov. 23, 1937 |
| 2,160,087 | Rosenberg | May 30, 1939 |
| 2,170,473 | Fitch | Aug. 22, 1939 |
| 2,226,399 | Frayer et al. | Dec. 24, 1940 |
| 2,318,825 | Wilcox | May 11, 1943 |
| 2,393,850 | Wilcox | Jan. 29, 1946 |
| 2,436,342 | Wilcox | Feb. 17, 1948 |